Sept. 16, 1924.  
D. R. KNAPP  
SELF ALIGNING BEARING FOR CABLEWAYS  
Filed Feb. 9, 1923
1,508,454
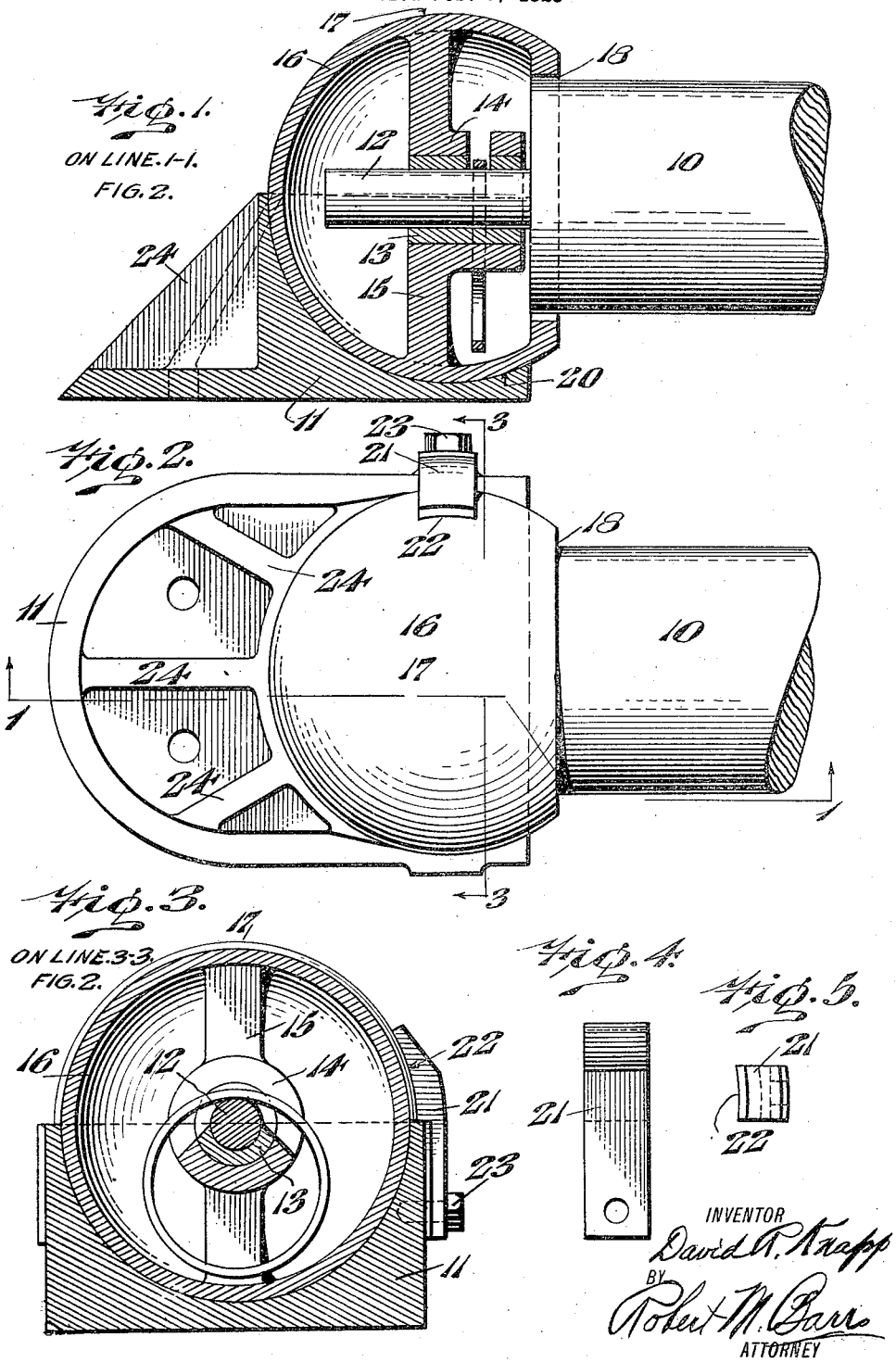

Patented Sept. 16, 1924.

1,508,454

UNITED STATES PATENT OFFICE.

DAVID R. KNAPP, OF PHILADELPHIA, PENNSYLVANIA.

SELF-ALIGNING BEARING FOR CABLEWAYS.

Application filed February 9, 1923. Serial No. 617,968.

*To all whom it may concern:*

Be it known that I, DAVID R. KNAPP, a citizen of the United States, and a resident of Philadelphia, county of Philadelphia, State of Pennsylvania, have invented certain new and useful Improvements in Self-Aligning Bearings for Cableways, of which the following is a specification.

Some of the objects of the present invention are to provide an improved bearing for journaling the ends of a roller used to support and guide a cable of the character employed in cable ways; to provide a freely adjustable bearing for a cable roller; to provide a bearing automatically responsive to forces applied by a traveling cable and capable of being self aligned to maintain the supporting roller in its most effective working position; to provide a bearing for rollers for a cable way wherein means are provided to insure the return of the cable in case of displacement without obstruction from any parts of the roller or its bearing; and to provide other improvements as will hereinafter appear.

In the accompanying drawing, Fig. 1 represents a sectional elevation of a self aligning bearing embodying one form of the present invention; Fig. 2 represents a plan of the same; Fig. 3 represents a section on line 3—3 of Fig. 2; Fig. 4 represents a detail in elevation of a retaining member employed; and Fig. 5 represents a plan of the same.

Referring to the drawings, a cylindrical roller 10 is shown, the ends of which are arranged to be journaled for self aligning movement in order to properly support and guide a traveling cable; to prevent displacement of the cable; to return the cable in case of displacement; and to relieve strain upon the bearings of the roller. For the present purpose but one end of the roller 10 is illustrated in conjunction with a bearing 11 embodying one form of the present invention though it is to be understood that the opposite end of the roller 10 is supported in a similar manner.

For rotatably supporting the roller 10, each end is provided with an axially disposed projecting shaft or spindle 12 which is journalled in a bushing 13, of brass or any other suitable material mounted in a hub 14, the latter being supported by spokes or radial arms 15 formed integral with a main bearing member 16. This member 16 is of substantially hollow construction, being shaped to provide a ball-like or spherical outer surface 17 which is cut away on the side of the roller 10 to form a circular opening 18 within which one end of the roller is received. The diameter of the opening 18 is preferably somewhat greater than the diameter of the roller 10 to form sufficient clearance to prevent binding of the roller in case of warping or distortion of the roller under natural causes. As the roller 10 terminates within the hollow member 16, it is impossible for the cable to ride off the end of the roller and drop upon the end shaft 12, but to the contrary in case of end displacement the cable is caused to ride up and over the exterior of the ball member 16.

In order to support the member 16 for universal movement, the bearing 11 is provided with a seat 20 having a semi-spherical contour conforming to the shape of the member 16 and formed on a radius which is substantially the same as the radius of the member 16, so that the member 16 can be freely placed in position upon and turn relative to the bearing 11. To retain the bearing member 16 so seated and properly journaled for relative movement, a retaining element is provided in the form of a removable detent 21 having a curved portion 22 formed on the same radius as the ball member 16. This detent 21 is rigidly fastened to the bearing base 11 by a stud 23 and when so positioned serves to hold the member 16 against removal from the part 11, though not interfering with the free relative movement thereof.

For the purpose of eliminating projections or other obstructions tending to catch or interfere with the cable in case of its displacement, the bearing support 11 is formed with strengthening webs 24 faced at substantially forty-five degrees to the vertical and merging into the inclined side wall of the base of the bearing 11. By this construction a smooth inclined guideway is provided by which the cable can ride back and over the surface 17 to its normal place upon the roller 10.

As a means for oiling the shaft 12, the bushing 13 and hub 14 may be transversely slotted as shown at 25 to receive a ring 26 which is suspended upon the shaft 12 and dips into a supply of oil contained in the bottom of the member 16. While a ring oiling device is shown, it is to be understood that the member 16 may be packed with waste and grease for lubricating the bearing, or any other suitable oiling means may be used.

From the foregoing it will be apparent that a complete unitary self-aligning bearing has been provided for rotatable guides or rollers of cable-ways, whereby provision is not only made for the automatic adjustment of the guide or roller in accordance with the variation of cable movement, but also to provide unobstructed means for directing the cable back to the guide or roller in case of its displacement. While the present device has been described more particularly for use with a cable-way, the invention is not limited to the specific use stated, because the roller 10 is of the idle type and may be employed in various mechanisms or mechanical operations requiring a rotatable support for a movable body.

While but a single form is shown in which this invention may be embodied, it is to be understood that the invention is not limited to any specific construction, but might be applied in various forms without departing from the spirit of the invention or the scope of the appended claims.

Having thus described my invention, I claim:

1. In a bearing construction for cable-ways, the combination of a rotatable guide for a cable, means for supporting one end of said guide for universal movement, and means forming a fixed guide to direct said cable to said rotatable guide in case of displacement.

2. In a bearing construction for cable-ways, the combination of a rotatable guide for a cable, a bearing for an end of said guide, a spherical-like member supporting said bearing, a fixed part having a spherical seat to receive said spherical member, and inclined guides to direct said cable over said fixed part to said roller in case of displacement.

3. In a bearing construction for cable-ways, a fixed part or base having a seat formed thereon, a spheroidal hollow member mounted for free movement in said seat, means to retain said parts in cooperative relation, a bearing formed in said hollow member for rotatably supporting an end of a cable guide, and webs on said base having inclined portions coacting with the outer surface of said hollow member to form a guide for a cable in case of displacement from said cable guide.

4. In a bearing construction for cable-ways, the combination of a guide roller, a hollow member arranged to receive one end of said roller and provide a clearance about said roller, a shaft carrying said roller, means in said member forming a bearing for said shaft, and means for supporting said hollow member for self-aligning action.

5. In a bearing construction for cable-ways, the combination of a guide roller for a cable, a spherical hollow member having an opening receiving and substantially closed by an end of said roller, a shaft projecting from said roller end and terminating within said member, a bearing for said shaft within said member, a fixed support having a complemental seat for said member, and means to retain said member in said seat for free movement relative thereto.

Signed at Philadelphia, in the county of Philadelphia, and State of Pennsylvania, this 6th day of Feb., 1923.

DAVID R. KNAPP.